(12) United States Patent
Besecker et al.

(10) Patent No.: US 11,935,192 B2
(45) Date of Patent: Mar. 19, 2024

(54) TECHNOLOGIES FOR 3D PLACEMENT OF VIRTUAL OBJECTS FROM A 2D LAYOUT

(71) Applicant: Marxent Labs, LLC, Miamisburg, OH (US)

(72) Inventors: Bret Besecker, St. Petersburg, FL (US); Barry Besecker, Xenia, OH (US); Jeffrey L. Cowgill, Jr., Bellbrook, OH (US); Jonathan Jekeli, Dayton, OH (US)

(73) Assignee: Marxent Labs LLC, Miamisburg, OH (US)

( * ) Notice: Subject to any disclaimer, the term of this patent is extended or adjusted under 35 U.S.C. 154(b) by 0 days.

(21) Appl. No.: 18/061,683

(22) Filed: Dec. 5, 2022

(65) Prior Publication Data

US 2023/0101953 A1    Mar. 30, 2023

Related U.S. Application Data

(63) Continuation of application No. 17/360,516, filed on Jun. 28, 2021, now Pat. No. 11,544,901, which is a
(Continued)

(51) Int. Cl.
*G06T 17/10* (2006.01)
*G06Q 30/0601* (2023.01)

(52) U.S. Cl.
CPC ......... *G06T 17/10* (2013.01); *G06Q 30/0643* (2013.01); *G06T 2200/04* (2013.01); *G06T 2200/08* (2013.01)

(58) Field of Classification Search
None
See application file for complete search history.

(56) References Cited

U.S. PATENT DOCUMENTS

| | | |
|---|---|---|
| 10,572,988 B1 | 2/2020 | Chaturvedi |
| 10,600,255 B2 | 3/2020 | Besecker |
| | (Continued) | |

OTHER PUBLICATIONS

International Patent Application No. PCT/US2019/028574, Notification of Transmittal of the International Search Report and the Written Opinion of the International Searching Authority, or the Declaration, dated Jul. 24, 2019, 12 pages.
(Continued)

*Primary Examiner* — Peter Hoang
(74) *Attorney, Agent, or Firm* — Sheppard Mullin Richter & Hampton LLP

(57) ABSTRACT

Technologies for 3D virtual environment placement of 3D models based on 2D images are disclosed. At least an outline of a 3D virtual environment may be generated. A 2D image of one or more 2D images may be identified. A first product from the first 2D image may be identified. At least one 3D model of one or more 3D models based, at least, on the first product may be determined. A first location for placement of the first product in the 3D virtual environment may be identified. The at least one 3D model may be added within the 3D virtual environment based, at least, on the first location. The 3D virtual environment may be rendered into a visually interpretable form. A second product may be identified from the first 2D image, forming a first grouping of products. A starting element for the first grouping of products may be determined.

14 Claims, 8 Drawing Sheets

Related U.S. Application Data continuation of application No. 16/391,075, filed on Apr. 22, 2019, now Pat. No. 11,049,317.

(60) Provisional application No. 62/660,594, filed on Apr. 20, 2018.

(56) References Cited

U.S. PATENT DOCUMENTS

| | | | |
|---|---|---|---|
| 10,614,625 | B1 | 4/2020 | Goetzinger, Jr. |
| 10,672,191 | B1 | 6/2020 | Besecker |
| 11,049,317 | B2 | 6/2021 | Besecker |
| 11,144,680 | B2 | 10/2021 | Jovanovic |
| 2002/0010655 | A1 | 1/2002 | Kjallstrom |
| 2005/0081161 | A1 | 4/2005 | MacInnes |
| 2008/0122840 | A1 | 5/2008 | Falco |
| 2013/0127893 | A1 | 5/2013 | Gokturk |
| 2015/0243071 | A1 | 8/2015 | Jovanovic |
| 2016/0026724 | A1 | 1/2016 | Ramsey |
| 2019/0197599 | A1* | 6/2019 | Zia .................... G06Q 30/0631 |
| 2021/0049829 | A1 | 2/2021 | Yang |
| 2021/0279957 | A1 | 9/2021 | Eder |
| 2022/0114291 | A1 | 4/2022 | Li |

OTHER PUBLICATIONS

International Patent Application No. PCT/US2018/028574, Notification of Transmittal of the International Search Report and the Written Opinion of the International Searching Authority, or the Declaration, dated Jul. 24, 2019, 12 pages.

International Patent Application No. PCT/US2019/028574, Notification Concerning Transmittal of International Preliminary Report on Patentability (Chapter I of the Patent Cooperation Treaty) and International Preliminary Report on Patentability, dated Oct. 29, 2020, 9 pages.

Liu, Zicheng, et al., "Model-Driven Indoor Scenes Modeling from a Single Image," Graphics Interface Conference, Jun. 3, 2015, 8 pages.

Satkin, Scott, et al., "Data-Driven Scene Understanding from 3D Models," https://www.robots.ox.ac.uk/~vgg/rg/pa/pers/bmvc2012_satkin_data_driven.pdf, dated Jan. 2012, retrieved Dec. 16, 2015, 11 pages.

Sweet Home, "Sweet Home 3D User's Guide;", online at <URL: https://web.archive.org/web/20180208100505/http://www.sweethome3d.com:80/userGuide.jsp>, Feb. 8, 2018 (Year: 2018), pp. 1-15.

Xu, Kun, et al., "Sketch2Scene: Sketch-Based Co-Retrieval and Co-Placement of 3D Models," ACM Transactions on Graphics, vol. 32, No. 4, Jul. 1, 2013, 12 pages.

Cant, R. J., et al., "Methods for Automated Object Placement in Virtual Scenes", 2009 11th International Conference on Computer Modelling and Simulation, Cambridge, UK, doi: 10.1109/UKSIM.2009.69., 2009 (Year: 2009), pp. 431-436.

He, Yu, et al., "Context-Consistent Generation of Indoor Virtual Environments Based on Geometry Constraints," IEEE Transactions on Visualization and Computer Graphics, vol. 28, No. 12, Dec. 2022 (Year: 2022), doi: 10.1109/TVCG.2021.3111729, pp. 3986-3999.

* cited by examiner

TECHNOLOGIES FOR 3D PLACEMENT OF VIRTUAL OBJECTS FROM A 2D LAYOUT

CROSS-REFERENCE TO RELATED APPLICATIONS

This application is a continuation of U.S. patent application Ser. No. 17/360,516, filed Jun. 28, 2021, which is a continuation of U.S. patent application Ser. No. 16/391,075, filed Apr. 22, 2019 (which issued as U.S. Pat. No. 11,049,317 on Jun. 29, 2021), which claims the benefit of U.S. Provisional Patent Application Ser. No. 62/660,594, filed Apr. 20, 2018, the contents of which being incorporated by reference herein in its entirety, for all purposes.

BACKGROUND

Consumers seeking to purchase furniture, applications and/or to remodel living spaces are often influenced by two-dimensional (2D) photographs that advertise a suite of furniture, set(s) of matching appliances, and/or renovated kitchens or bathrooms. However, it is difficult to efficiently render a 2D photograph within the dimensions of the consumer's living space. Using available tools involves painstaking trial and error in order to replicate an arrangement of products shown in a 2D photograph.

SUMMARY

Technologies for 3D virtual environment placement of 3D models based on 2D images are disclosed. At least an outline of a 3D virtual environment may be generated. A 2D image of one or more 2D images may be identified. A first product from the first 2D image may be identified. At least one 3D model of one or more 3D models based, at least, on the first product may be determined. A first location for placement of the first product in the 3D virtual environment may be identified. The at least one 3D model may be added within the 3D virtual environment based, at least, on the first location. The 3D virtual environment may be rendered into a visually interpretable form. A second product may be identified from the first 2D image, forming a first grouping of products. A starting element for the first grouping of products may be determined.

BRIEF DESCRIPTION OF DRAWINGS

The elements and other features, advantages and disclosures contained herein, and the manner of attaining them, will become apparent and the present disclosure will be better understood by reference to the following description of various examples of the present disclosure taken in conjunction with the accompanying drawings, wherein.

DETAILED DESCRIPTION

Figure 1:
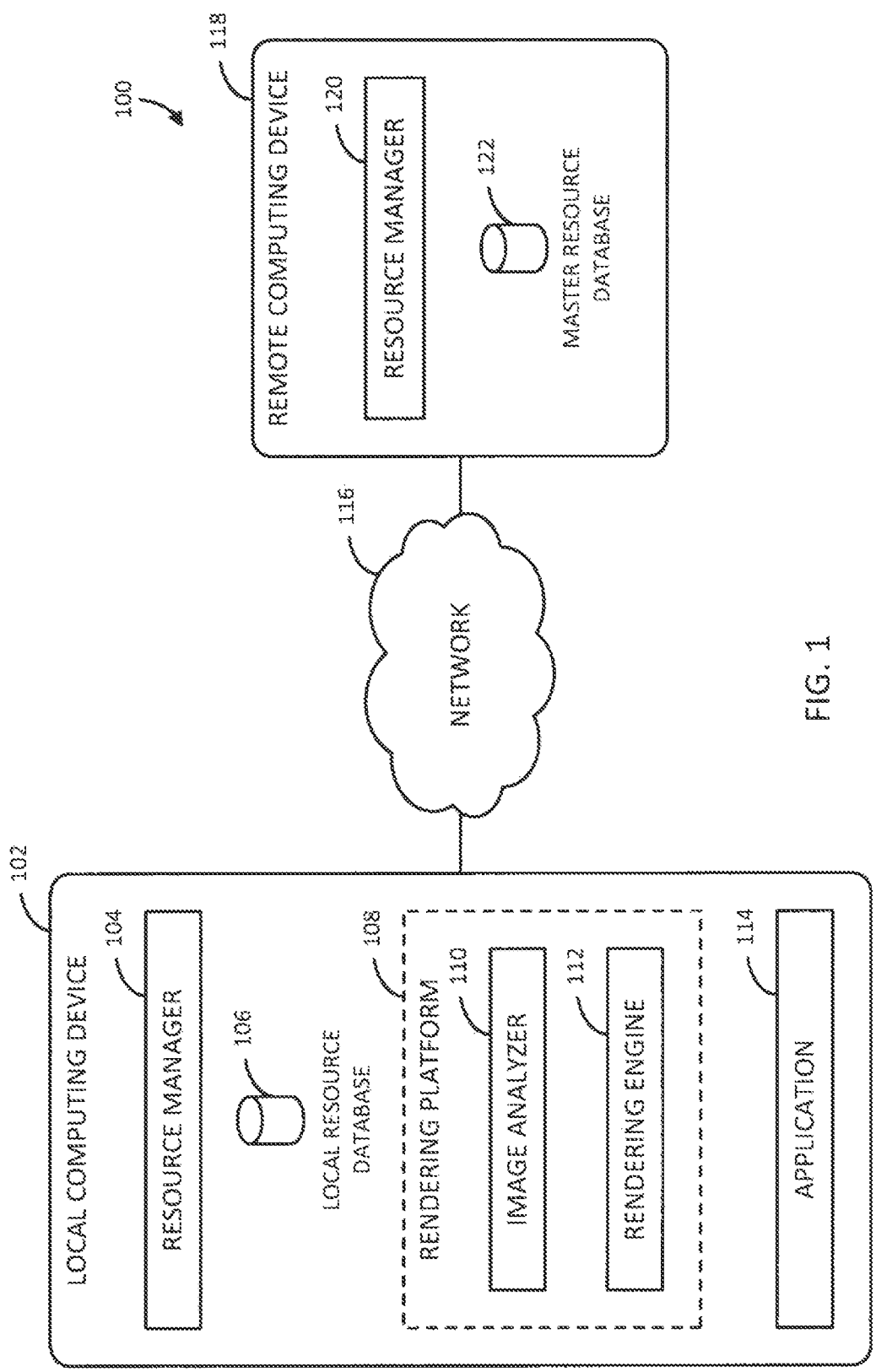
FIG. 1 is an example block diagram of at least system for 3D placement of 3D models based on a 2D layout.

For the purposes of promoting an understanding of the principles of the present disclosure, reference will now be made to the examples illustrated in the drawings, and specific language will be used to describe the same. It will nevertheless be understood that no limitation of the scope of this disclosure is thereby intended.

FIG. 1 is an example system 100 for 3D placement of 3D models from a 2D layout according to the present disclosure. Shown in FIG. 1 are a local computing device 102 and a remote computing device 118 communicatively coupled via a network 116. The illustrative local computing device 102 includes a resource manager 104 and an application 114. The application 114 of the local computing device 102 interfaces with a user (e.g., via a touchscreen display) to compose a virtual reality setting, including for 3D placement of 3D models based on a 2D layout. The application 114 may be embodied as any combination of hardware, firmware, software, or circuitry usable to perform the functions described herein.

The local computing device 102 may be embodied as any type of computing device capable of performing the functions described herein. Illustrative examples of such local computing device 102 may include, but are not limited to, smartphones, wearables (e.g., smartwatches, smart glasses, etc.), tablets, laptops, and the like. Accordingly, the local computing device 102 may include any type of firmware, hardware, software, circuitry, or combination thereof capable of performing the functions described herein.

Figure 2:
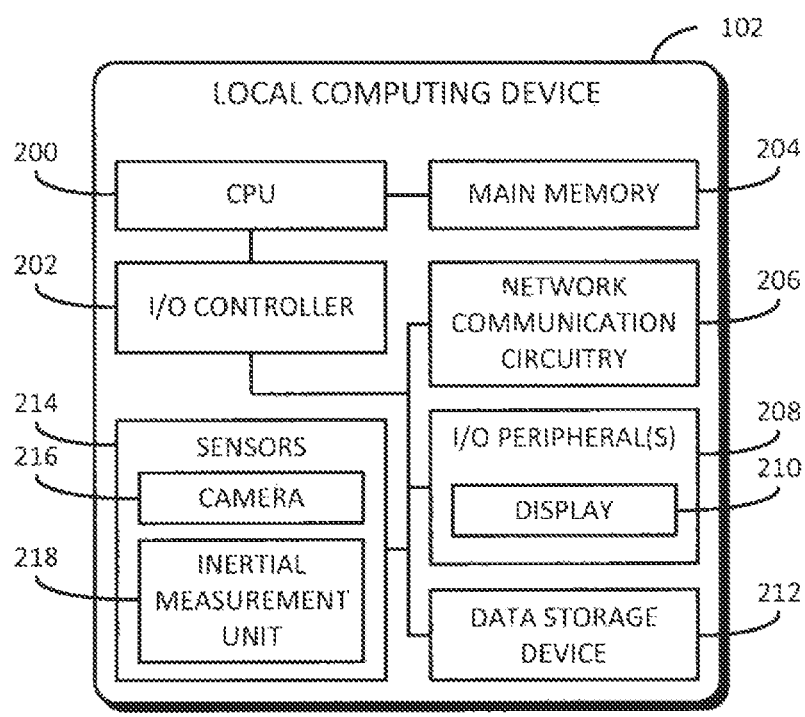
FIG. 2 is an example block diagram of at least one computing device of the system of FIG. 1.

Referring now to FIG. 2, the illustrative local computing device 102 may include a central processing unit (CPU) 200, an input/output (I/O) controller 202, a memory 204, network communication circuitry 206, one or more I/O peripherals 208, a data storage device 212, and various sensors 214. In one or more scenarios, local computing device 102 may include additional, fewer, and/or alternative components to those of the illustrative local computing device 102, such as a graphics processing unit (GPU). One or more of the illustrative components may be combined on a single system-on-a-chip (SoC) on a single integrated circuit (IC). The type of components of the respective local computing device 102 may be predicated upon the type and/or intended use of the respective local computing device 102.

The CPU 200, or processor, may be embodied as any combination of hardware and circuitry capable of processing data. In one or more scenarios, the local computing device 102 may include more than one CPU 200. In one or more scenarios, the CPU 200 may include at least one processing core (not shown), such as in a single-core processor architecture, or multiple processing cores, such as in a multi-core processor architecture. Irrespective of the number of processing cores and CPUs 200, the CPU 200 may be capable of reading and/or executing program instructions. In one or more scenarios, the CPU 200 may include cache memory (not shown) that may be integrated directly with the CPU 200 or placed on a separate chip with a separate interconnect to the CPU 200. In one or more scenarios, pipeline logic may be used to perform software and/or hardware operations (e.g., network traffic processing operations), rather than commands issued to/from the CPU 200.

The I/O controller 202, or I/O interface, may be embodied as any type of computer hardware or combination of circuitry capable of interfacing between input/output devices and the local computing device 102. Illustratively, the I/O controller 202 may be configured to receive input/output requests from the CPU 200, and send control signals to the respective input/output devices, thereby managing the data flow to/from the local computing device 102.

The memory 204 may be embodied as any type of computer hardware or combination of circuitry capable of holding data and instructions for processing. Such memory 204 may be referred to as main or primary memory. In one or more scenarios, one or more components of the local computing device 102 may have direct access to memory, such that certain data may be stored via direct memory access (DMA) independently of the CPU 200.

The network communication circuitry 206 may be embodied as any type of computer hardware or combination of circuitry capable of managing network interfacing communications (e.g., messages, datagrams, packets, etc.) via wireless and/or wired communication modes. In one or more scenarios, the network communication circuitry 206 may include a network interface controller (NIC) capable of being configured to connect the local computing device 102 to a computer network, as well as other devices.

The one or more I/O peripherals 208 may be embodied as any auxiliary device configured to connect to and communicate with the local computing device 102. For example, the I/O peripherals 208 may include, but are not limited to, a mouse, a keyboard, a monitor, a touchscreen, a printer, a scanner, a microphone, a speaker, etc. Accordingly, it should be appreciated that some 110 devices are capable of one function (i.e., input or output), or both functions (i.e., input and output). The illustrative I/O peripherals 208 includes a display, which may be embodied as a touchscreen display capable of receiving user input via touch (e.g., one or more fingers, a stylus, etc.).

In one or more scenarios, the I/O peripherals 208 may be connected to the local computing device 102 via a cable (e.g., a ribbon cable, a wire, a universal serial bus (USB) cable, a high-definition multimedia interface (HDMI) cable, etc.) of the local computing device 102. In one or more scenarios, the cable may be connected to a corresponding port (not shown) of the local computing device 102 for which the communications made there between can be managed by the I/O controller 202. In one or more scenarios, the I/O peripherals 208 may be connected to the local computing device 102 via a wireless mode of communication (e.g., Bluetooth®, Wi-Fi®, etc.) which can be managed by the network communication circuitry 206.

The data storage device 212 may be embodied as any type of computer hardware capable of the non-volatile storage of data (e.g., semiconductor storage media, magnetic storage media, optical storage media, etc.). Such data storage devices 212 are commonly referred to as auxiliary or secondary storage, and may be used to store a large amount of data relative to the memory 204 described above.

The illustrative sensors 214 include a camera sensor 216 and an inertial measurement unit (IMU) sensor 218. In one or more scenarios, the sensors 214 may include one or more additional sensors 214. The camera sensor 216 may be embodied as any type of image sensor (e.g., complementary metal-oxide-semiconductor (CMOS), charge-coupled device (CCD), hybrid CCD/CMOS, etc.) capable of capturing different types of scene data, such as color image data (RGB), color and depth image data (RGBD camera), depth sensor, stereo camera (L/R RGB), YUV, GRAY scale, or any other image sensor technology that can generate digital image frames.

The IMU sensor 218 may include one or more software or hardware gyroscopes to measure the orientation of the local computing device 102 (e.g., a 3-axis gyroscope), accelerometers to measure proper acceleration of the local computing device 102 (e.g., a 3-axis accelerometer), magnetometers to measure the direction of the Earth's magnetic field relative to the local computing device 102 (e.g., a 3-axis magnetometer), or any other type of inertial motion measurement software/hardware usable to perform the functions described herein (e.g., measure motion along three perpendicular linear axes and the rotation around each of the three perpendicular linear axes).

Referring back to FIG. 1, the remote computing device 118 may be embodied as any type of compute and/or storage device capable of performing the functions described herein. For example, the remote computing device 118 may be embodied as, but is not limited to, one or more servers (e.g., stand-alone, rack-mounted, etc.), compute devices, storage devices, routers, switches, and/or combination of compute blades and data storage devices (e.g., of a storage area network (SAN)) in a cloud architected network or data center. As such, while the remote computing device 118 is illustrated as a single computing device, in one or more scenarios, the remote computing device 118 may include more than one computing device (e.g., in a distributed computing architecture), one or more, or each, of which may be usable to perform at least a portion of the functions described herein.

The remote computing device 118 may contain like components to that of the illustrative local computing device 102 of FIG. 2. Accordingly, such like components are not described herein to preserve clarity of the description. In one or more scenarios in which the remote computing device 118 may include more than one computing device, one or more, or each, computing device of the remote computing device 118 may include different components (i.e., hardware/software resources), the types of which may be predicated upon the type and intended use of each computing device. For example, one or more computing devices of the remote computing device 118 may be configured as a database server with less compute capacity relative to the compute capacity of another of the computing devices of the remote computing device 118. Similarly, one or more other computing devices of the remote computing device 118 may be configured as an application server with more compute capacity relative to the compute capacity of another computing device of the remote computing device 118.

The network 116 may be implemented as any type of wired and/or wireless network, including a local area network (LAN), a wide area network (WAN), a global network (the Internet), etc. Accordingly, the network 116 may include one or more communicatively coupled network computing devices (not shown) for facilitating the flow and/or processing of network communication traffic via a series of wired and/or wireless interconnects. Such network computing devices may include, but are not limited to, one or more access points, routers, switches, servers, compute devices, storage devices, etc.

In one or more scenarios, product data may be stored in master resource database 122, which may comprise a content management system ("CMS"). Product data may refer to a set of data that is keyed to a unique product identifier, such as, for example, dimensions and/or type of surface on which the 3D model of such a product may (e.g., must) be placed in a 3D virtual environment (e.g., wall, floor, and/or ceiling). Products in this context may represent distinct 3D models that can be placed in a 3D virtual environment. Products may represent a retail product that can be purchased by a user of local computing device 102. In one or more scenarios, master resource database 122 further comprises 3D model data. 3D model data may include, for example, a product identifier of the product that represents that 3D model, the abstracted surface on which the 3D model must be installed, and its relationships to other 3D models including layer depth layer, horizontal order, vertical order, rotation offset, height offset, focal group, facing direction, and the like.

Improvements may be useful to provide technologies that may efficiently render objects (e.g., consumer products) that appear in 2D images (e.g., photographs) in 3D virtual environment(s).

Figure 3:
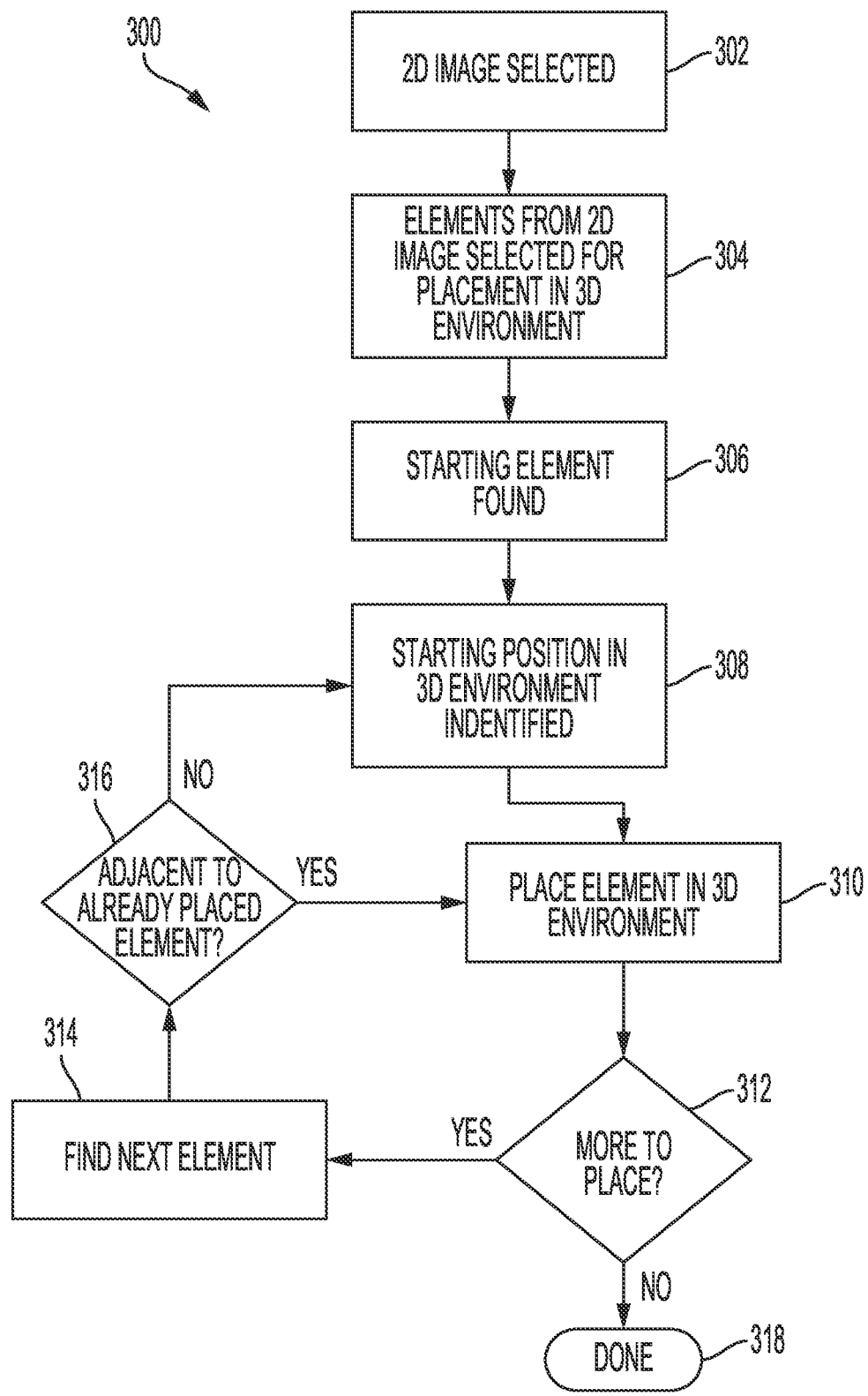
FIG. 3 is an example flow diagram of at least one technique for 3D placement of 3D models based on a 2D layout that may be executed by the computing device of FIG. 1 and/or FIG. 2.

Referring now to FIG. 3, an illustrative method 300 is provided for placement of 3D models into a 3D virtual environment based on a 2D layout that may be executed by a computing device (e.g., the local computing device 102 of FIG. 1), or more particularly by the resource manager 104 and application 114 of the local computing device 102. It should be appreciated that, prior to the method 300 being invoked, local resource database 106 and/or master resource database 122 may include any number of 3D models of various objects.

The method 300 begins at 302, in which application 114 may be used to provide a 3D virtual environment on local computing device 102. A 3D virtual environment according to the present disclosure may be any three-dimensional extent in which 3D models have relative direction and/or position represented by three linear dimensions. Examples of a 3D virtual environment according to the present disclosure include, a computer rendering in a 3D perspective, a 3D virtual reality simulation, and/or a physical space viewed through display 210 of local computing device 102 with augmented reality overlays of 3D models in 3D. In one or more scenarios, display 210 of local computing device 102 may be a touchscreen display responsive to contact from a human digit, stylus, and/or other input device. Through interaction with display 210 of local computing device 102 and application 114, three dimensional boundaries (e.g., outline) of a 3D virtual environment are established. Overhead lighting, doors, windows, flooring, floor coverings, and/or wall colors, and/or the like may be added to the 3D virtual environment within the three dimensional boundaries. A 2D image of a desired 3D layout may be selected. Portions of the pixel array of the 2D image may be mapped to product data in the CMS.

In one or more scenarios, the layout, extents, and/or dimensions of the 3D virtual environment may be obtained from an existing database of floorplans and/or building templates. In one or more scenarios, the layout and/or dimensions of the 3D virtual environment may be analyzed by the local computing device 102 and/or remote computing device. Additional layout information may be stored for the 3D virtual environment. For example, the 3D virtual environment may be analyzed and/or categorized, perhaps for example according to shape, (e.g. G shaped, L shaped, and/or T shaped). In one or more scenarios, the 3D virtual environment may be (e.g., automatically) modified, perhaps for example to satisfy criteria including: accessibility, maneuverability, and/or safety regulations, among others.

For example, the 3D virtual environment may be modified to ensure appropriate spacing between walls for accessibility to utility outlets. In one or more scenarios, the 3D virtual environment may be (e.g., automatically) created and/or modified using one or more procedural algorithms to construct one or more 3D environmental components that may include including but not limited to walkways, ventilation, stairs, windows, and/or doorways, etc.

In one or more scenarios, the one or more procedural algorithm(s) that may be used to construct the aforementioned components may be driven by a rule set(s) specifying the generation criteria. For example, the rule set used for procedurally generating doors may include one or more rules specifying that door frames may (e.g., may only) be placed on walls of at least 36" in width and/or 7' of height. The rule set may specify that the door frames might not be placed such that an open door may intersect with another wall on either side of the door frame. In other words, the door frame may (e.g., may only) be placed in locations where the door may be fully opened. For example, the procedural algorithm for creation of stairs may utilize one or rule sets specifying that the height of one or more, or each, step might not exceed 10" and/or may be at least 7", and/or that one or more, or each, step may be (e.g., must be) at least 10" wide. The procedural algorithm may not proceed, perhaps for example if the creation may violate any generation rules. In one or more scenarios, the generation rules may be dynamically set and/or switched at application run time, may be provided by an external source, such as by uploading a file containing formatted rules, and/or may be provided through the resource database 106, among others, for example.

In one or more scenarios, the 2D image may be provided as at least a part of a presorted selection of one or more images stored in the local resource database 106. In one or more scenarios, the 2D image may be selected from an assortment supplied by an external resource database and/or web service. For example, the 2D image may be selected from a trending list of room arrangements provided by a social media web site. In one or more scenarios, the selected 2D image of the desired layout may be processed by the image analyzer 110 to extract arrangement and/or decor styling information, perhaps for example to guide the (e.g., automatic) selection and/or placement of 3D product models within the 3D virtual environment(s). For example, the image analyzer 110 may extract wall color and/or may identify floor covering material from a 2D image that may be uploaded by the user.

In one or more scenarios, the image analyzer may utilize existing computer vision and/or machine learning algorithms to identify the floor, walls, and/or other items of interest and/or may sample the color and/or patterns visible on one or more, or each, object.

In one or more scenarios, the image analyzer may process the selected 2D image and/or may identify one or more types of objects, perhaps for example with regard to basic function(s), and/or their relative arrangement within the 2D image. The image analyzer may utilize one or more existing machine learning algorithms for performing the aforementioned techniques.

In one or more scenarios, the extracted object identifiers may be used to guide the identification and/or selection of similarly functional products available within the local resource database 106. For example, the image analyzer may process a 2D image selected by the user and/or may identify a reclining chair in the image by a window. This information may provide a list of available reclining chairs within the local resource database 106, perhaps for example with suggestions and/or (e.g., automatic) placement of a most closely resembling product next to a window within the 3D virtual environment.

In one or more scenarios, the image analyzer may process the selected 2D image, perhaps for example in order to (e.g., precisely) identify the exact object within the image so that the manufacturer of the object and/or the availability of the object with respect to a commerce system may be provided to the user. In one or more scenarios, the image analyzer 110 may process one or more images in real time to extract data. In one or more scenarios, the image analyzer may run in isolation to extract information on a bulk group of 2D images storing the extracted information within the local resource database 106 and/or remote storage database 122. In one or more scenarios, the image analyzer 106 may be replaced by an existing artificial intelligence and/or machine learning alternative created to fulfill the same operations as the image analyzer.

In one or more scenarios, the 3D virtual environment may be converted into a 2D image representation, perhaps for example to facilitate the creation of a new (e.g., fresh and/or previously unused) arrangement(s) and/or decor style 2D image(s). In one or more scenarios, the conversion of the 3D virtual environment to 2D image may be performed through the rendering platform 108. In one or more scenarios, the conversion of the 3D virtual environment to 2D image may be performed by the remote computing device 118. In one or more scenarios, the conversion of the 3D virtual environment to 2D image may be performed by the local computing device 104. In one or more scenarios, the 2D image created from the 3D virtual environment may be provided for use by other remote computing operations. For example, the 2D image created from the 3D virtual environment may be provided and/or posted to a social media network that may be made visible to a select list of the user's contacts.

In one or more scenarios, the created 2D image from the 3D virtual environment may be processed by the image analyzer 110, perhaps for example in order to identify similarities between the created image and other 2D images stored within the local resource database 106, the remote resource database 122, and/or a separate resource database. For example, the created 2D image from the 3D virtual environment may be compared against a trending list of similar 2D images that may be provided by a social media network(s).

At 304, a product and/or grouping of products from the 2D image may be selected for placement in the 3D virtual environment established at 302. As described elsewhere herein, a user may indicate which product(s) to render and/or a location at which to begin rendering the 3D models of the products relative to the 3D virtual environment captured by the local computing device 102 (e.g., via the display 210 of the local computing device 102 or via the camera sensor 216 of the local computing device 102).

In one or more scenarios, the user may (e.g., may only) select a 2D image portraying a desired arrangement and/or decor style for furnishing a room. One or more 3D models matching the selected arrangement and/or decor style may be chosen (e.g., automatically) from the local resource database 106. In one or more scenarios, the (e.g., automatically) selected products may be chosen, perhaps for example based on any number of criteria defining the degree to which one or more, or each, product matches the arrangement and/or decor style from the 2D image. In one or more scenarios, the criteria for identifying products matching the arrangement and/or decor style may include: 3D dimensions, color, texture, composing material, and/or function of the products, among others.

In one or more scenarios, the (e.g., automatically) selected 3D models may be chosen, perhaps for example based on the available/unoccupied space within the 3D virtual environment(s). In one or more scenarios, the placement locations of the (e.g., automatically) chosen 3D models may be determine, perhaps for example based on the arrangement and/or decor style from the chosen 2D image. In one or more scenarios, the 3D models of the (e.g., automatically) selected product(s) might not match the products shown in the 2D image but may be chosen, perhaps for example due to: size restrictions of the 3D virtual environment, and/or availability of purchase of the products, and/or other criteria. In one or more scenarios, the (e.g., automatic) selection of 3D models may be chosen, perhaps for example based on one or more functional rules associating one or more, or multiple, products to one another. For example, the decor options in the selected 2D image may result in the selection of a table lamp. The one or more functional rules of the decor may indicate (e.g., require) that an end table be selected, perhaps for example in order for the table lamp to be placed.

In one or more scenarios, selection of a 2D image to set decor style may include the ability to change one or more visible properties of the 3D virtual environment. The one or more visible properties may include: the wall color, floor color, floor covering, ceiling color, and/or ceiling covering, and/or the like, perhaps for example to match the decor style of the 2D image, among other reasons.

Resource manager 104 may determine whether the necessary 3D models may be stored in the local resource database 106. If so, the resource manager 104 transmits the 3D models to the rendering platform 108 such that the rendering engine 112 of the rendering platform 108 can render the object as a function of the 3D models received from the resource manager 104. Perhaps for example, if the resource manager 104 determines that a 3D model is not stored in the local resource database 106, the resource manager 104 may transmit a request to a master resource database at a remote computing device (e.g., the master resource database 122 of the remote computing device 118) requesting the missing 3D model. The request may be usable by the resource manager 120 of the remote computing device 118 to determine which 3D model is being requested and return the requested 3D model to the resource manager 104 of the local computing device 102. The resource manager 104 may store the 3D model received from the remote computing device 118 to the local resource database 106. The resource manager 104 may transmit the 3D model to the rendering platform 108 such that the rendering engine 112 of the rendering platform 108 can render the object as a function of the 3D model received from the resource manager 104.

In one or more scenarios, one or more, or each, grouping of products from the 2D image may include a starting element that forms the anchor for rendering the grouping of products in the 3D virtual environment. At 306, the starting element for the grouping of products selected at 304 may be identified.

In one or more scenarios, the starting element may be predefined, perhaps for example based on one or more priority values that may be assigned to one or more, or each, element within the 2D image. The highest priority element within the selected group may be taken as the starting element for the placement algorithm. In one or more scenarios, user selection may be used to allow the user to specify the priority of placement. In one or more scenarios, the selected elements may be processed at runtime against a set of rules, perhaps for example to determine placement priority. For example, a rule set may specify that tables have higher placement priority over lamps. The selected elements from the 2D image may be sorted such that one or more, or all, tables may be placed before any lamps are placed, for example.

Figure 4:
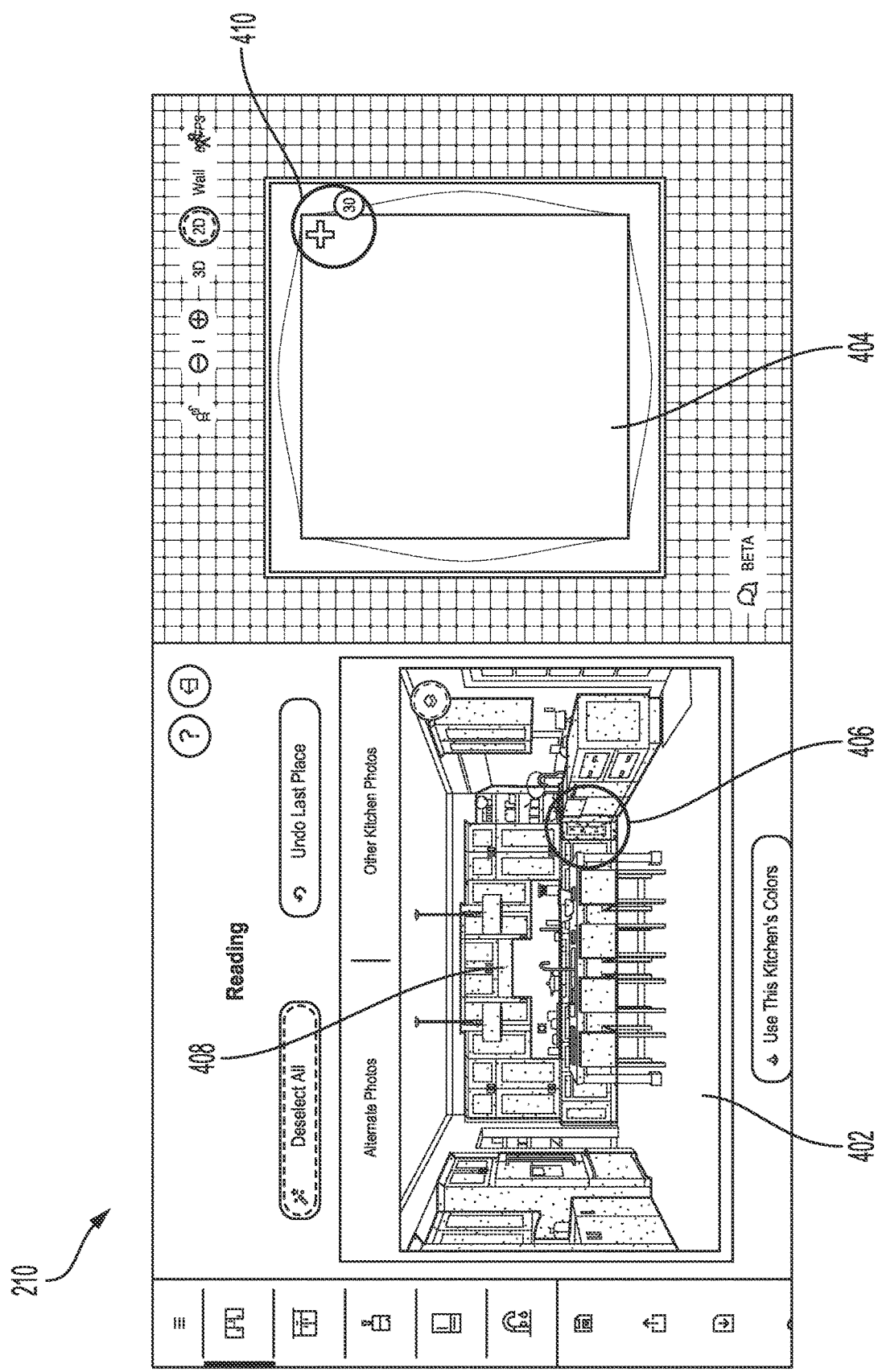
FIG. 4 shows an example technology for 3D placement of 3D models based on a 2D layout according to the present disclosure.

FIG. 4 illustrates 2D image 402 and 3D virtual environment 404, as such items might appear on display 210 of the local computing device 102. As shown in FIG. 4, the corner cabinet 406 from 2D image 402 may be the starting element for cabinet set 408. At 308, the location of the starting element may be identified in the 3D virtual environment. The corner cabinet 406 from 2D image 402 may be placed at location 410 in 3D virtual environment 404.

At 310, the 3D model of corner cabinet 406 may be placed at location 410 in 3D virtual environment 404. Cabinet set 408 may comprise one or more, or multiple, products, one or more, or each, of which may be represented as a 3D model in local resource database 106 and/or master resource database 122. Perhaps for example after the 3D model of corner cabinet 406 may be placed at location 410 in 3D virtual environment 404, among other scenarios, the 3D models of the other products that comprise cabinet set 408 may be retrieved (e.g., automatically) from the local resource database 106 and/or the master resource database 122 and/or may be placed in 3D virtual environment 404, as described at 312, 314, and 316 of FIG. 3. At 318, the technique may terminate or continue as more products from the 2D image may or might not be selected for addition to the 3D virtual environment.

Figure 5:
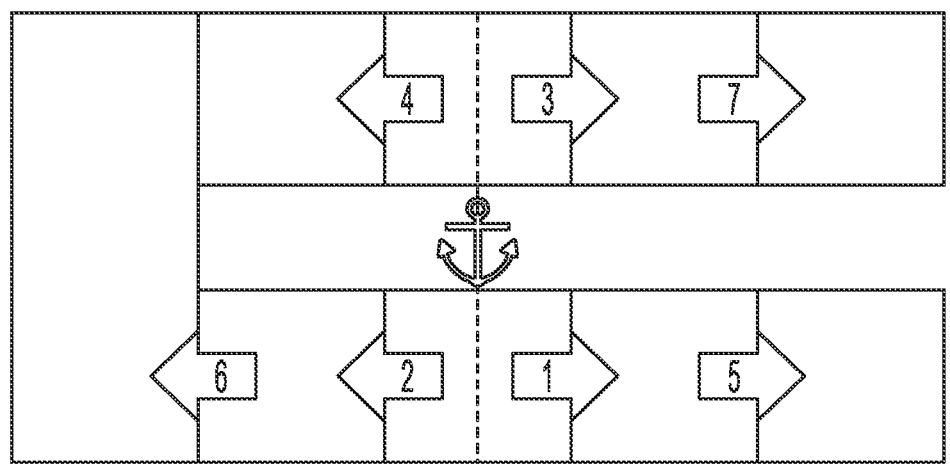
FIG. 5 shows an example technology for 3D placement of 3D models based on a 2D layout according to the present disclosure.

FIG. 5 shows an example diagram illustrating how 3D models may be (e.g., automatically) placed in one or more 3D virtual environments, for example by virtue of adjacency to an anchor point and/or to a previously placed 3D model. A 3D model's relative position to one or more, or all, the adjacent 3D models and/or surfaces may be used to place the 3D model represented in the 2D layout at an (e.g., appropriate) location in the one or more 3D virtual environments. One or more entry points and/or anchor points may be found from the 3D models to be placed in the one or more 3D virtual environments. Perhaps for example if the 3D models chosen from the 2D layout do not include a specified anchor, among other scenarios, then placement may proceed from left to right through the 3D models chosen. An input may be useful (e.g., required) to start the placement based on the starting 3D model. Perhaps for example after a starting point is determined, among other scenarios, one or more, or all, the 3D models may be placed using one or more virtual placement methods. A placement may follow an available path of unvisited 3D models, perhaps for example until it reaches a dead-end. In one or more scenarios, one or more new (e.g., fresh and/or previously unused) paths of unvisited 3D models may be started.

In one or more scenarios, this may be repeated, perhaps for example until one or more, or all, paths are visited. Perhaps for example if the 3D models picked from the layout may include one or more, or multiple, anchors and/or gaps between 3D models that are on different surfaces, among other scenarios, then another input may be useful (e.g., required) to pick at least one 3D position to establish one or more new (e.g., fresh and/or previously unused) starting points.

In one or more scenarios, the starting location for (e.g., automatic) placement of 3D models might not utilize user input. In one or more scenarios, the starting location for (e.g., automatic) placement of 3D models may be chosen by one or more placement algorithms, perhaps for example using information about the dimensions of the walls, floors, and/or ceilings of the virtual environment, and/or locations of existing 3D models previously placed within the virtual environment, among others. In one or more scenarios, the placement method may determine if already placed 3D models may (e.g., should) be moved, perhaps for example in order to accommodate further (e.g., automatic) placement of one or more additional 3D models.

In one or more scenarios, the placement method(s) may (e.g., iteratively) modify placement(s), perhaps for example in order to establish the (e.g., most optimal) locations for one or more, or all, (e.g., automatically) placed 3D models in accordance with one or more arrangement/decor style rules. In one or more scenarios, the (e.g., automatic) placement of 3D models may identify the usefulness (e.g., requirement) of one or more additional 3D models that may fit into the (e.g., optimal) space. For example, 3D models for cabinets may be (e.g., automatically) placed along a wall to fit from one corner to another corner. The wall length may be such that a gap may be present between the ending wall and the ending cabinet. The (e.g., automatic) placement may identify within the local asset resource database 106 and/or remote resource database 122 one or more additional fill models which, when placed accordingly, may close the gap. In one or more scenarios, the (e.g., automatic) placement may identify when (e.g., automatically) placed products may conflict with one or more (e.g., predetermined) layout rules and/or regulations. For example, the (e.g., automatic) placement of cabinets along a wall may identify if cabinets were too close to a stove hood, perhaps causing a violation of fire code(s).

In one or more scenarios, the one or more 3D models may include associated mounting data, and/or one or more mounting points, that may define one or more 3D locations and/or bounds of the 3D model, which may be used as reference points for subsequent models against which to be placed. In one or more scenarios, the mounting data might not be directly associated with the 3D model and/or may be computed at runtime, perhaps for example based on the extents of the 3D model geometry, the type of object the 3D geometry represents, such as a table or a lamp, and/or one or more rules associating types of geometry to the generation of one or more mounting points.

For example, a 3D model of a table may be processed at runtime and/or the extents of the geometry may be used to create 3D mounting points at the top corners of the table top. One or more rules associated with table geometry may be invoked causing an additional mounting point to be created at the center of the table top, perhaps for example at the geometric center of the four corners of the table top. In one or more scenarios, the 3D mounting points may contain data describing the types of 3D model geometry to which they may be used for placement. For example, one or more mounting points created on a table top may be created with data indicating that the one or more mounting points may be used for placement of table lamps.

In one or more scenarios, the placement algorithm(s), as they may proceed through (e.g., automatic) placement, may consider the unused mounting points and/or associated mounting data within the 3D virtual environment, perhaps for example in order to determine viable locations for placing the remaining 3D model data, among other reasons. In one or more scenarios, the 3D mounting points may be replaced by 3D planes that may describe a geometric surface of a 3D model. For example, a mounting plane for a table top may be defined using the surface normal of the table top and/or the extents of the table top geometry. In one or more scenarios, the placement algorithm(s) may consider the mounting planes and/or associated mounting data within the 3D virtual environment, perhaps for example in order to determine one or more viable locations for placing the remaining 3D model data.

In one or more scenarios, the placement algorithm(s), perhaps for example as it/they identify one or more, or multiple, mounting points and/or mounting planes, may prioritize which mounting point(s) and/or plane(s) that may be based on one or more aesthetic rules associated with the 2D image 402, and/or provided from another source. In one or more scenarios, the one or more aesthetic rules may provide hierarchical information specifying precedence of characteristics. For example, one or more aesthetic rules may specify mounting points furthest from windows may be higher priority for placing table lamps than mounting surfaces closest to windows. The placement algorithm(s) may use the one or more aesthetic rules to filter the viable mounting points and/or planes within the 3D virtual environment, perhaps for example until a suitable (e.g., most suitable) mounting location is identified.

Figure 6:
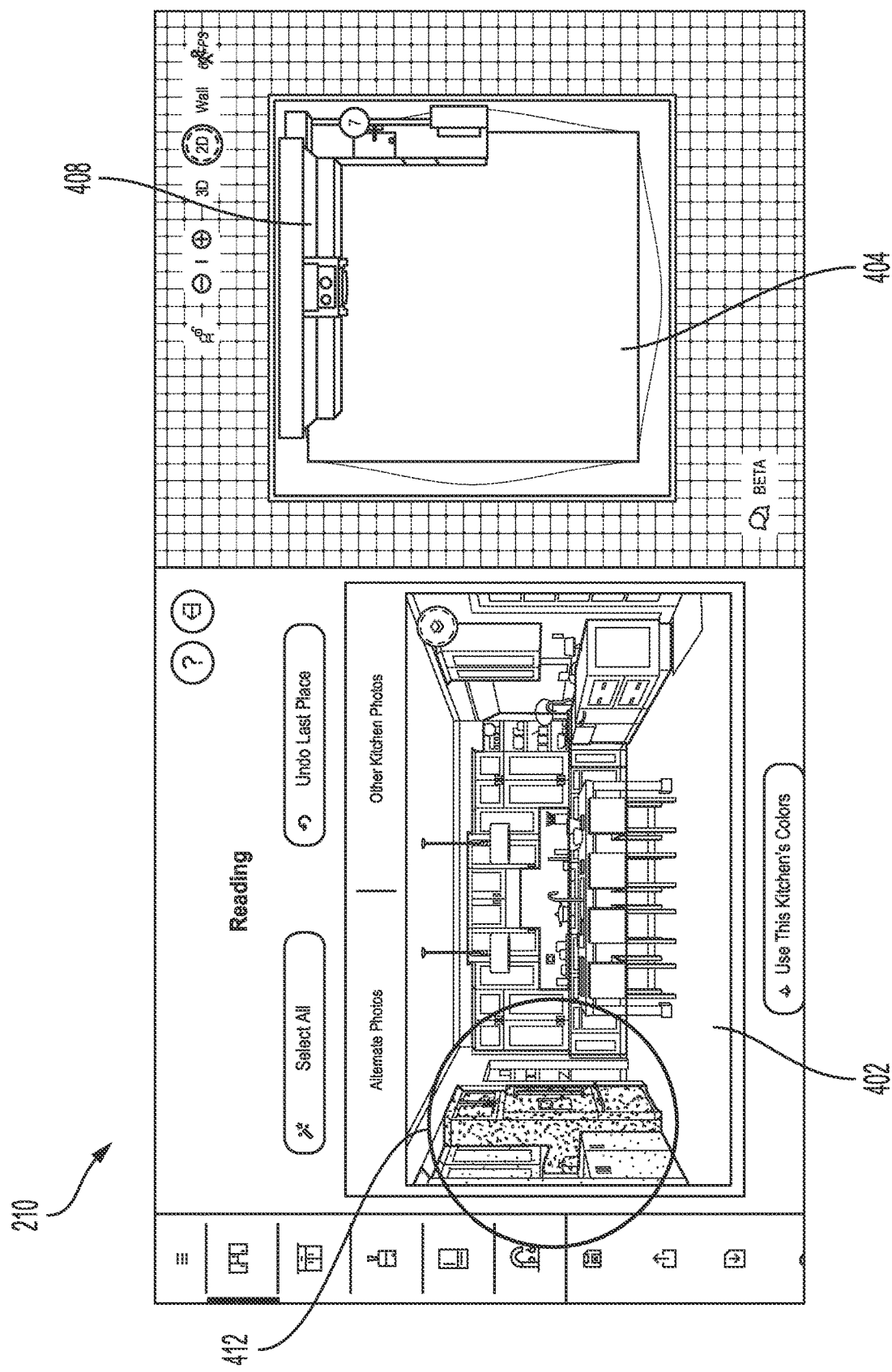
FIG. 6 shows an example technology for 3D placement of 3D models based on a 2D layout according to the present disclosure.

FIG. 6 illustrates 2D image 402 and 3D virtual environment 404, as such items might appear on display 210 of the local computing device 102. As shown in FIG. 6, one or more 3D models of the entire cabinet set 408 may be placed into 3D virtual environment 404, perhaps for example based on the location 410 that may have been selected for the anchor point, corner cabinet 406. As also shown in FIG. 6, refrigerator 412 may be selected as the next starting element to be placed into 3D virtual environment 404.

Figure 7:
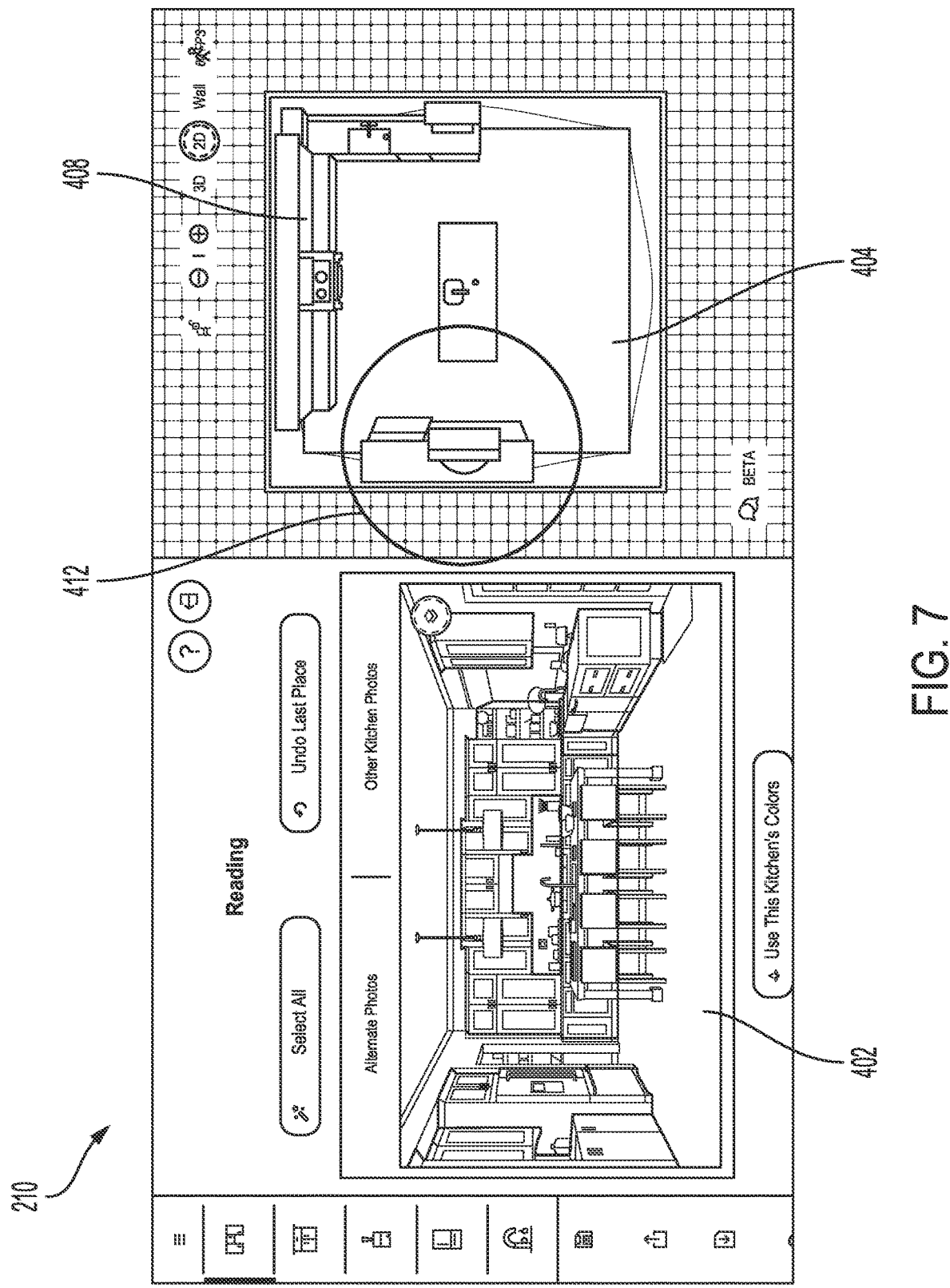
FIG. 7 shows an example technology for 3D placement of 3D models based on a 2D layout according to the present disclosure.

FIG. 7 illustrates 2D image 402 and 3D virtual environment 404, as such items might appear on display 210 of the local computing device 102. As shown in FIG. 7, 3D models of refrigerator 412 and its associated products are placed into 3D virtual environment 404, based on the location that was selected for the anchor point, refrigerator 412. As also shown in FIG. 6, refrigerator 412 may be selected as the next anchor item to be placed into 3D virtual environment 404.

Figure 8:
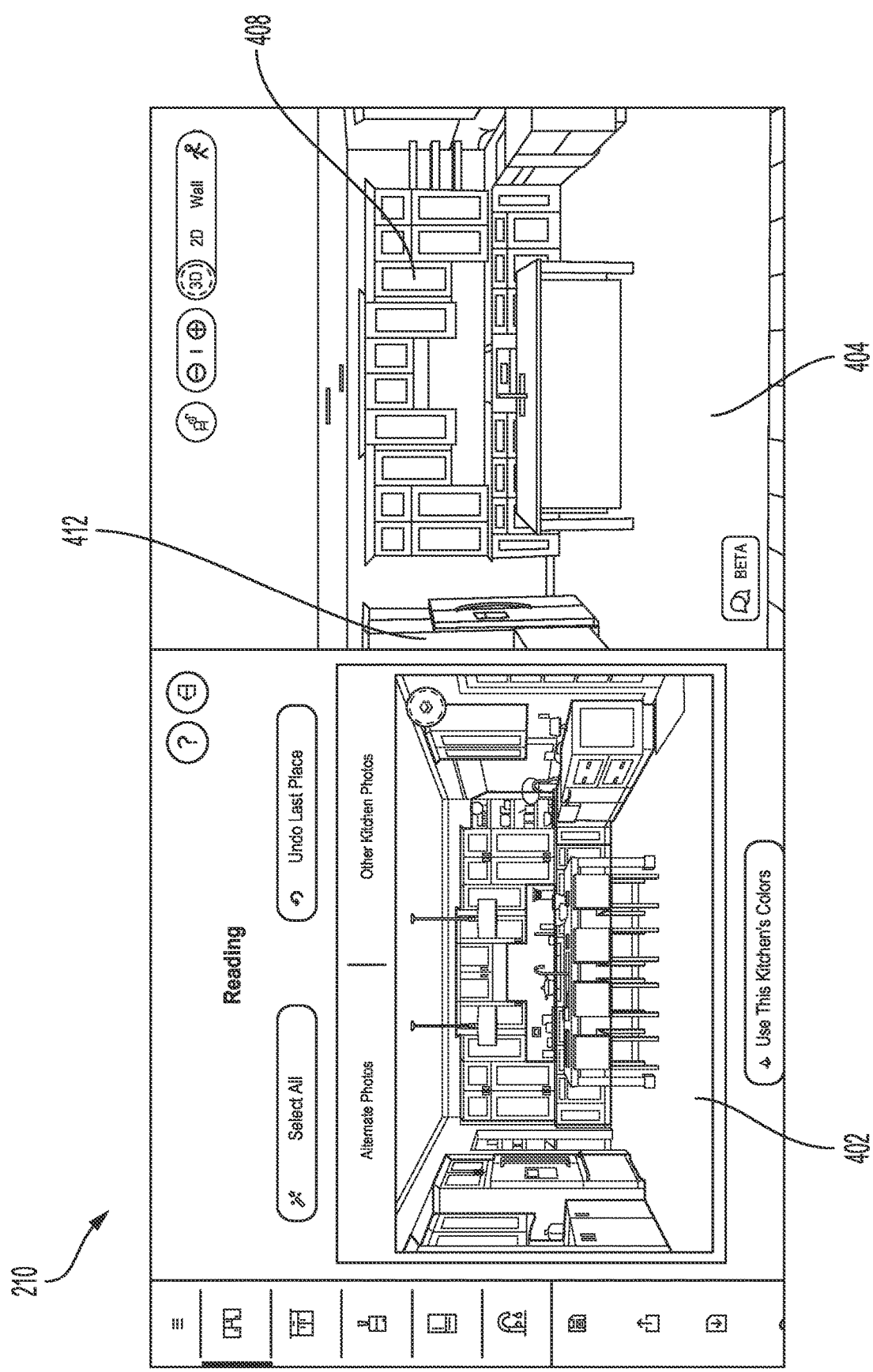
FIG. 8 shows an example technology for 3D placement of 3D models based on a 2D layout according to the present disclosure.

FIG. 8 illustrates 2D image 402 and 3D virtual environment 404, as such items might appear on display 210 of the local computing device 102. As shown in FIG. 8, 3D virtual environment 404 may be finalized. The composition of the 3D virtual environment and/or the addition of 3D models may be done iteratively. For example, a preliminary 3D virtual environment may be composed, and then after 3D models are added the 3D virtual environment may be modified. Virtual objects may be added to or subtracted from the modified 3D virtual environment, and then may be modified again. The process can be repeated over and over.

Referring back to FIG. 1, resource manager 104, which may be embodied as any type of firmware, hardware, software, circuitry, or combination thereof, may be configured to manage the 3D models stored in the local resource database 106. For example, the resource manager 104 may be configured to receive a request from the application 114 that includes identifying information of objects that are to be rendered as 3D models. Upon receiving the request, the resource manager 104 may be configured to determine whether the corresponding 3D models are stored in the local resource database 106 (e.g., via a read/query operation). If the resource manager 104 determines that one or more, or all, of the 3D models may be stored in the local resource database 106, the resource manager 104 may be configured to retrieve the 3D models from the local resource database 106 and transmit them to the application 114. If any of the 3D models are not detected, the resource manager 104 may be configured to retrieve the missing 3D models from the remote computing device 118, or more particularly the resource manager 120 of the remote computing device 118. Accordingly, the resource manager 120 can retrieve the requested 3D models from a master resource database 122 of the remote computing device and return them to the resource manager 104 via network 116.

The rendering platform 108 may be embodied as any combination of hardware, firmware, software, or circuitry usable to perform the functions described herein. The illustrative rendering platform 108 includes an image analyzer 110 and a rendering engine 112, each of which may be embodied as any type of firmware, hardware, software, circuitry, or combination thereof, that may be configured to perform the functions described herein. In one or more scenarios, the resource manager 104, the image analyzer 110, and/or the rendering engine 112 may include one or more computer-readable medium (e.g., the memory 204, the data storage device 212, and/or any other media storage device) having instructions stored thereon and one or more processors (e.g., the CPU 200) coupled with the one or more computer-readable medium and configured to execute instructions to perform the functions described herein.

The image analyzer 110, which may be embodied as any type of firmware, hardware, software, circuitry, or combination thereof, may be configured to analyze the captured image to determine one or more features of the images captured by the computing device 104, or more particularly by the camera sensor(s) 216 of the computing device 104.

The rendering engine 112, which may be embodied as any type of firmware, hardware, software, circuitry, or combination thereof, may be configured to generate an image from a 2D or 3D model, such as may be received from the master resource database 122 of the remote computing device 118 and stored in the local resource database 106 of the computing device 104. It should be appreciated that the rendering engine 112 may be configured to render the objects in real-time (i.e., real-time rendering).

The application 114 may be embodied as any type of network-based software application (e.g., cloud application, network application, software-as-a-service (SaaS) application, etc.) configured to communicate with the remote computing device 118 (e.g., in a client-server architecture) over the network 116. As described previously, the application 114 may be configured to serve as a software-based interface between the user (e.g., via a graphical user interface (GUI) of the application) and the resource manager 104.

The application 114 may be configured to interface with the image analyzer 110 to retrieve the identified features and the rendering engine 112 to provide the image and objects to be rendered therein. In one or more scenarios, the resource manager 104 may be a portion of the application 114. In other words, resource manager 104 may be installed with the application, such that the initialization and/or the population of the 3D model data of the local resource database 106 is relative to the installation of the application 114 and/or the execution of the application 114. One or more settings of the resource manager 104 may be controlled by the user via the user interface of the application 114.

The systems and methods described in the present disclosure are designed to facilitate the easy placement of complex arrangements of objects in a 3D virtual environment by simply selecting 3D models in a layout or series of layouts and then selecting where in the 3D virtual environment the 3D models should be placed starting with an anchor point. In a kitchen application an anchor could be a sink, oven and hood, or a refrigerator. A coffee table or large couch might also be anchor points for a layout of furniture. This solution allows for many 3D models from a single layout to be placed into a complex 3D arrangement with minimal outside input once 3D models are selected from the layout. Using this approach, 3D models can be chosen out of one or more, or multiple, layouts and combined to create a unique 3D arrangement, merging favorite 3D models of each layout.

In one or more scenarios, system 100 may be configured to determine the resolution, and/or the file size, of 3D models on an object-specific and/or platform-specific basis. For instance, system 100 may be configured to asynchronously and/or automatically generate different resolutions and/or compression formats for one or more, or all, supported operating systems and/or hardware devices. Object and platform combinations with a specific resolution of a 3D model that may be used are identified by system 100. System 100 also can identify which objects in a room type or application should be featured and therefore have higher resolution.

In one or more scenarios, system 100 may be configured to recognize device capacity (for example, local computing device 102) and may adapt accordingly. For example, for a device and/or a virtual reality setting, system 100 may have a certain budget for 3D model memory, perhaps for example because of how many objects may be in the virtual reality setting and/or rendering capacity of the device. Remote computing device 118 can see the mobile device's capacity. The remote computing device 118 may serve the right texture resolution, perhaps for example based upon the capability of the mobile device. System 100 can be configured to allocate more memory for (e.g., important) objects. The memory and/or the resolution may vary, perhaps for example depending on the distance of the user's perspective from the objects in view.

In one or more scenarios, system 100 may be configured to interface with commerce systems and/or inventory management systems. Commerce systems and/or inventory management systems may define objects as "models" with "options. "For instance, a rug might come in three sizes and three colors. In commerce systems and/or inventory management systems, there may be a model ID and/or object ID for the rug itself, and/or a SKU for one or more, or each, variation of size and/or color. In one or more scenarios, the model ID and/or object ID alone might be insufficient to provide the user with a rendering of one or more, or all, options of the object. In one or more scenarios, system 100 may configured to resolve one or more, or all, possible SKU options, and/or to render 3D models of one or more, or each, object, perhaps for example using one or more, or each, possible variation. In one or more scenarios, system 100 may process one or more 3D models in relation to one or more, or each, SKU option, and/or may understand the relationship of the model ID and/or object ID to the SKU.

In one or more scenarios, system 100 may be configured to use procedural modeling. For example, system 100 may be configured for cabinet doors by defining a 2D profile of the door and the rules for how to offset door and drawer style profiles from the face of a cabinet. System 100 may be configured to dynamically "stretch" the door parameters to fit one door to any cabinet size, instead of modeling every door shape and size. For example, system 100 can be configured to do this for crown molding, shoe molding, countertops, counter-top edge profiles, baseboards, ceiling structures, showers, and/or ceiling lights, etc.

In one or more scenarios, system 100 may be configured to render "assemblies," which are objects mounted on other objects and/or arranged into some kind of layout. For example, cabinets in a kitchen, a faucet on a vanity, and/or a lamp on a table are examples of assemblies. System 100 can be configured with the ability to pre-assemble objects into compound objects and/or assemblies, and/or apply a specific price to the compound object and/or assembly. System 100 can be configured with the ability to mount an object on another object using one or more rules and/or metadata that may define fit, location, and/or compatibility. System 100 can be configured such that assemblies can also be editable or not editable.

In one or more scenarios, system 100 may be configured with one or more business rules for objects and/or assemblies that may define what object and/or assembly can physically fit, where the object and/or assembly may fit, how the object and/or assembly may be oriented, and/or whether the object and/or assembly can be changed. For example, system 100 may be configured with an "object class" concept to define compatibility/fit between objects. For example, a 3-hole faucet fits only on a 3-hole vanity, or a sofa must rest on a floor, or a dishwasher must be against a wall and under a countertop. In another example, if a user attempts to place two 3D models in the same virtual space, system 100 may be configured to determine the compatibility/fit between such objects and arrange them accordingly. For example, if a user attempts to place a virtual end table and a virtual lamp in the same virtual location, system 100 may be configured to arrange the virtual end table on the floor of the virtual space, and the virtual lamp on top of the virtual end table. For example, system 100 may be configured to allow for various levels of specificity to determine fit. Sometimes there may be (e.g., may only be) one specific object that can fit on another specific object. Other times there may be a larger set of objects that can fit together. In addition to physical compatibility, for example, system 100 may be configured to allow for merchandising rules that allow the content managers to say which categories or other object attributes are allowed to fit in a location. For example, system 100 may be configured to such that the user can put any 3-hole faucet on this 3-hole vanity (using object class), but only Kohler® faucets are allowed if the users want a specific price over a Labor Day Sale (using object manufacturer).

In one or more scenarios, system 100 may be configured with one or more composition properties that may define how an object can be composed in a scene. For example, regarding refrigerators, system 100 may be configured to require that refrigerators have to be mounted on a floor and against a wall, that the refrigerators cannot be rotated, and/or that refrigerator doors can be rotated, but perhaps only about a specific anchoring point and/or within a specific arc.

In one or more scenarios, system 100 may be configured with one or more composition properties that may allow animations of objects for manipulating one or more object parts, perhaps for example to show the object inside and/or some range of motion. For example, regarding refrigerators, system 100 may be configured to allow animation to be data-driven and/or assigned for class(es) and/or objects, perhaps for example assigned to one or more, or each, (e.g., specific) 3D model. System 100 can be configured to allow objects to make sounds, and/or for lighting (e.g., lights, lamps, and/or ceiling fans) to have properties that may allow control of angle, spread, and/or intensity.

Augmented reality blends a user's environment with digital information (e.g., 3D models), generally in real time.

In other words, the digital information may be embedded, or overlays, the actual environment. Typically, image recognition software analyzes environment information as detected from one or more images of the environment, as well as a location of the computing device that captured the image relative to the environment at the time at which the respective images were taken, and renders realistic 3D models in the environment. Because it can be difficult to anticipate the movement of the computing device relative to the environment in advance, among other reasons, the 3D models may be rendered in real-time. Elements/components of system 100 disclosed herein may be adapted for augmented reality.

While the present disclosure has been illustrated and described in detail in the drawings and foregoing description, the same is to be considered as illustrative and not restrictive in character, it being understood that only certain examples have been shown and described, and that all changes and modifications that come within the spirit of the present disclosure are desired to be protected.

What is claimed is:

1. A computer-implemented system for performing image analysis of a two-dimensional (2D) image to identify an object in the 2D image and for determining an available product corresponding to the object identified in the 2D image, the computer-implemented system comprising:
   at least one resource database configured to store a data structure for storing a set of product data for one or more products, the product data for a product comprising a set of attributes, a unique product identifier and three-dimensional (3D) model data;
   a processor;
   a memory encoded with instructions which when executed, cause the processor to:
   provide a first graphical user interface portion configured to present one or more images from a set of 2D images and a user interface element to enable the user to select one of the 2D images;
   operate an image analyzer component, upon receipt of the user-selected 2D image, to perform an image analysis process on the 2D image to identify a first object depicted in the 2D image;
   determine a set of attributes associated with the first object, the set of attributes comprising at least one of object type, object function, object color, and/or object size;
   determine at least one product from the at least one resource database that corresponds with one or more attributes of the set of attributes associated with the first object;
   obtain from the at least one resource database 3D model data for the at least one product;
   provide the 3D model data for the at least one product to a rendering engine for rendering a 3D model of the at least one product at a first location in a 3D virtual environment; and
   provide a second graphical user interface portion configured to display the 3D virtual environment and a user interface element that enables the user to move the 3D model to a second location for placement in the 3D virtual environment.

2. The computer-implemented system of claim 1, wherein the set of attributes further comprises object texture and object composing material.

3. The computer-implemented system of claim 1, wherein the at least one resource database comprises a local resource database and a master resource database and further comprising a resource manager configured to receive a request for 3D model data for the at least one product and determine whether the requested 3D model data is stored in the local resource database and retrieve the 3D model data from the local resource database.

4. The computer-implemented system of claim 1, wherein the at least one resource database comprises a local resource database and a master resource database and further comprising a resource manager configured to receive a request for 3D model data for the at least one product and determine whether the requested 3D model data is stored in the local resource database and, if not, determine whether the requested 3D model data is stored in the master resource database and retrieve the 3D model data from the master resource database.

5. The computer-implemented system of claim 1, wherein the graphical user interface is further configured to display the 3D model data for a set of available products.

6. The computer-implemented system of claim 1, wherein the set of 2D images comprise images of products and a layout of the products in a room, wherein the image analyzer component is further configured to process the 2D image to extract from the 2D image an arrangement and/or decor styling information to guide an automatic selection and/or placement of the 3D model data within the 3D virtual environment.

7. The computer-implemented system of claim 1, wherein user selection of the one or more products in the selected 2D image for placement in the 3D virtual environment comprises at least a first product and a second product forming a first grouping of products, wherein the rendering engine is configured to determine a starting element for the first grouping of products, where the starting element comprises the first product or the second product; and identifying a starting location for placement of the starting element wherein the starting element forms an anchor for rendering the first grouping of products in the 3D virtual environment and the rendering engine is further configured to render 3D models of the first grouping of products, with the 3D models of the products comprising the starting element being rendered at the starting location.

8. The computer-implemented system of claim 1, further comprising a computer interface to an product inventory management system and the graphical user interface is configured to present a display option for a user to initiate purchase of one or more of the one or more products in the user-selected 2D image via the display option.

9. The computer-implemented system of claim 1, wherein the at least one resource database comprises a master resource database comprising a content management system configured to store product data comprising for at least one product, a set of data keyed to a unique product identifier and 3D model data for the at least one product.

10. The computer-implemented system of claim 1 wherein the graphical user interface is further configured to provide a display option for user selection of a 2D image portraying a room layout and the processor is further configured to automatically determine products, from the at least one resource database, based on one or more functional rules associating one or more products to one another.

11. The computer-implemented system of claim 1, wherein the graphical user interface is further configured to provide display information, comprising:
   a first display portion for presenting an option for the user to select from the set of 2D images representing layouts of products in a room;
   a second display portion for displaying objects from the user-selected 2D image;

a display option to enable the user to select an object from the displayed objects; and third display portion for simultaneously displaying the 3D virtual environment; and wherein the processor is further configured to:

identify from the 3D model data, in response to receiving a user selection of an object from the set of 2D images of layouts, 3D model data for a product corresponding to the selected object;

generate the 3D model of the selected object for display in the 3D virtual environment; and render the 3D model in the 3D virtual environment.

12. The computer-implemented system of claim 1, wherein the 3D virtual environment comprises a virtual reality setting for placement of 3D models based on 2D images.

13. The computer-implemented system of claim 1, wherein the set of attributes are stored in the memory.

14. The computer-implemented system of claim 1, wherein the 2D image is posted to a social media network that is made visible to a select list of the user's contacts.

\* \* \* \* \*